Patented Jan. 16, 1951

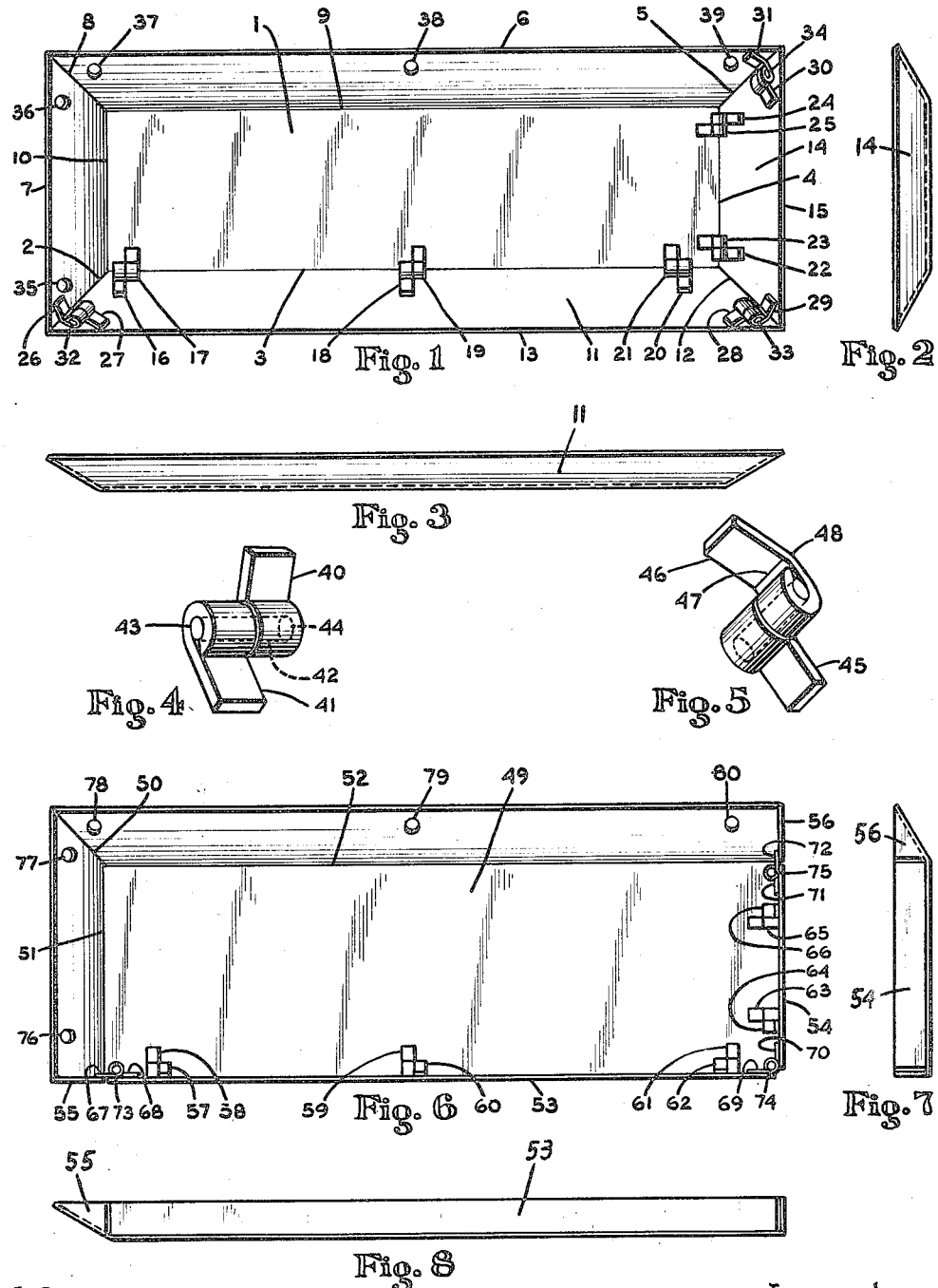

2,538,599

UNITED STATES PATENT OFFICE 2,538,599

FARM UTILITY BOAT

Harold Swanson, Brownhelm Township, Lorain County, Ohio

Application May 27, 1947, Serial No. 750,675

5 Claims. (Cl. 280—19)

This invention relates to improvements in constructing farm utility boats which can be used for several purposes in agricultural operations, but more particularly as a load carrying boat that slides over the surface of the ground and is hauled about with a farm tractor.

One object of this invention is to construct a farm utility boat inits simplest form and still be as durable and useful as possible.

A further object is that the farm utility boat of this invention can be hauled either lengthwise or sideways.

A further object is that when this farm utility boat is hauled sideways it becomes an ideal planker or clod crushing means in fitting out soil for agricultural field planting operations.

A further object is to construct a farm utility boat from heavy metal plate such as strong steel plate approximately one-half inch (½") thick so as to enable it to withstand severe bumping without breakage.

A further object is that by constructing this farm utility boat from heavy steel plate, (stainless steel would be preferable but prohibitive in cost) it can lay around almost anyplace on a farm exposed to all kinds of weather and still be serviceable after many years of such treatment. It being obvious that paint and shelter naturally prolongs its usefulness.

A further object is to construct a farm utility boat of a convenient size (approximately three feet wide by eight feet long) from a rectangular steel plate that has at least one end and one side bent or formed upward to act as prows for the bottom surface or full width runner across the boat as it is hauled either lengthwise or sideways over the ground.

A further object is that this farm utility boat shall have a brim extending all around the top several inches from the bottom to hold stones, dirt, manure and other materials thereon when hauled over the earth.

A further object is that the said upward formed prows of one end and side of this farm utility boat, acts as the above mentioned brim to hold in such materials that are hauled; and also provides a convenient place to start hand shoveling potatoes, ear corn, coal, etc., when unloading such material; and also provides an easy sweep-out incline for dirt and water when cleaning the boat.

A further object is to construct a farm utility boat that has a brim all around the top several inches (approximately four) above the bottom. This brim is formed on one end and one side by the top edges of the prows, and is formed on the opposite end and side by the top edges of heavy steel hinge plates that swing down, so as to lie flat on the ground to permit heavy stones or boulders, logs, barrels, farm implements, etc., to be rolled upon the boat.

A further object is that a farm utility boat can be made without the hinge plate feature but still retain the other features mentioned herein, such as the feature of being hauled lengthwise or sideways.

Other objects of this invention will appear more fully described and illustrated hereinafter.

Fig. 1, Fig. 2, and Fig. 3 show one farm utility boat by three views in third-angle orthographic projection, a plan or top elevation (Fig. 1), an end elevation (Fig. 2), and a side elevation (Fig. 3).

Fig. 4 is a strap hinge for a farm utility boat hinge plate shown by a modified perspective view.

Fig. 5 is a strap clevis for a farm utility boat hinge plate shown by a modified perspective view.

Fig. 6, Fig. 7, and Fig. 8 show another farm utility boat by three views in third-angle orthographic projection, a plan or top elevation (Fig. 6), an end elevation (Fig. 7), and a side elevation (Fig. 8).

Referring to Fig. 1, Fig. 2, and Fig. 3 collectively which show a farm utility boat having a large heavy steel plate 1 which is cut out along the edges 2, 3, 4, 5, 6, and 7, with a narrow V cut out that closes together and is electric welded at 8 when the plate 1 is bent upward on lines 9 and 10 to form the main plate of the boat; a long heavy steel plate 11 which is cut out along the edges 2, 3, 12, and 13, to form the side hinge plate of the boat; a short heavy steel plate 14 which is cut out along the edges 4, 5, 12, and 15, to form the end hinge plate of the boat; strap hinge plates 16 and 17, 18 and 19, 20 and 21, 22 and 23, 24 and 25, with hinge pins therein (similar to Fig. 4) are placed as shown and electric welded respectively to the main plate 1, side hinge plate 11, and end hinge plate 14; strap clevis plates 26 and 27, 28 and 29, 30 and 31 (similar to Fig. 5) are placed as shown and electric welded respectively to the main plate 1, side hinge plate 11, and end hinge plate 14, so that the clevis plates can be fastened together in the positions shown by removable clevis pins inserted through the holes in the clevises at 32, 33, and 34; holes are cut at 35, 36, 37, 38, and 39 or at any other convenient location for attaching chains, draw bars, or any other boat hauling hitch to the tractor when towing the boat lengthwise or sideways respectively.

Referring to Fig. 4 which shows two hinge strap plates 40 and 41 for a farm utility boat hinge plate; each plate 40 and 41 is formed cylindrical on one end around a hinge pin 42 which is slightly riveted on its ends 43 and 44 to hold the plates 40 and 41 together and still permit a swivel action around the pin 42. It is obvious that plates 40 and 41 can be made alike before they are assembled together with pin 42.

Referring to Fig. 5 which shows two strap clevis plates 45 and 46 placed together to fit in a valley at the junction of hinge plates for a farm utility boat; plate 45 is made similar to plates 40 and 41 in Fig. 4; plate 46 is made similar to plate 45 with an additional bend on line 47 so that its angle at the apex 48 will fit in each valley on line 2, 5, and 12 in Fig. 1. It is obvious that plate 45 can be set above plate 46 instead of as shown, so that they will fit together like plates 26 and 27 in Fig. 1.

Referring to Fig. 6, Fig. 7, and Fig. 8 collectively which show a farm utility boat having a large rectangular heavy steel plate 49 with a narrow V cut out that closes together and is electric welded at 50 when the plate 49 is bent upward on lines 51 and 52 to form the main plate of the boat; a long rectangular heavy steel plate 53 forms the side hinge plate of the boat; a short rectangular heavy steel plate 54 forms the end hinge plate of the boat; heavy steel gusset plates 55 and 56 are cut out to fit and are electric welded to the main plate 49 as shown; strap hinge plates 57 and 58, 59 and 60, 61 and 62, 63 and 64, 65 and 66, with hinge pins therein (similar to Fig. 4) are placed as shown and electric welded respectively to the main plate 49, side hinge plate 53, and end hinge plate 54; strap clevis plates 67 and 68, 69 and 70, 71 and 72, (similar to plate 45 in Fig. 5) are placed as shown and electric welded respectively to the gusset plates 55 and 56, side hinge plate 53, and end hinge plate 54, so that the clevis plates can be fastened together in the positions shown, by removable clevis pins inserted through the holes in the clevises at 73, 74, and 75; holes are cut at 76, 77, 78, 79, and 80, or at any other convenient location for attaching chains, draw bars, or any other boat hauling hitch to the tractor when towing the boat lengthwise or sideways respectively. In the manufacture of the large main plate of a farm utility boat, a large bending brake press is used to bend the end and side upward to form the prows for the full length and full width runner surface of the boat; however when such brake press is not available, the plate can be heated to a forging temperature and bent by pounding with a sledge. Another method of forming the prows for the full length and full width runner surface of the boat, would be to cut out separate narrow plates to the size of the prows with an oxy-acetylene torch and then butt electric weld them to the main plate of the boat at the proper incline angle. Another method would be to burn out a series of slots with an oxy-acetylene torch on the bend line of the main plate to make the bending operation easier, and later after the bending is done, the slots can be electric welded shut.

A farm utility boat approximately three feet wide by eight feet long (3' x 8') would be nearly the most common size, however the dimensions could be altered to suit any size that might be required for a particular need. Also the thickness of the steel plate could be made to suit any special requirement.

In some cases it may be desirable to provide extra hauling or hitching holes on the opposite side similar to those holes shown at 35 to 39 in Fig. 1, in order that the boat may be towed in either direction such as backwards or forwards; also such extra holes would provide a place to hitch rope, wire, or chain that can be used to tie or fasten boxes, fence posts, bales of straw or hay, etc., while they are hauled on the farm utility boat.

When a farm utility boat is mostly used to haul long logs, the end hinge plate 14 in Fig. 1, can be removed, or it can drag along the ground.

When V type draw bars are made for towing a farm utility boat, a farm tractor can push the boat backwards if necessary to maneuver it to any desired position; whereas with a chain hitch the boat can be only towed forward.

When holes wear through the bottom of a farm utility boat, steel patch plates can be electric welded in place to prolong its usefulness. Also almost any kind of an attaching bracket, lug, hook, pipe, bar, strap, etc., can be electric welded to the boat to suit some particular requirement.

It is obvious that the building operations can be changed without altering these features; for example all electric welding can be otherwise welded or brazed; the locations of the hinges and clevis plates can be re-arranged; the prows for the runner surface of the bottom plate can be curved upwards instead of a straight bend; or the boats can be made symmetrically opposite to those shown; none of which changes the combination of features claimed herein.

I claim:

1. In a farm utility boat, the combination of, a main steel plate with a long steel hinge plate and a short steel hinge plate all attached together to form a rectangular farm utility boat that slides on the earth and hauls materials, said main plate having a flat bottom surface to provide a full width and full length runner surface for said boat, said main plate having one end and one side bent upwardly to provide prows for said full width and full length runner surface, said prows having holes for attaching a hitch and providing a means to tow said boat either lengthwise or sideways along the earth, said hinge plates attached to said main plate with hinges and clevises, the top of said prows and said hinge plates forming a brim to hold materials in said boat, said hinges providing a means to swing said hinge plates flat on the earth to load and unload materials from said boat, said clevises providing a means to hold said hinge plates up to form part of said brim.

2. A farm utility boat that slides on the earth and hauls materials, consisting of, a main steel plate with a long steel hinge plate and a short steel hinge plate all attached together to form a farm utility boat of rectangular shape, said main plate having a flat bottom surface forming a full width and full length runner surface for said boat, said main plate having one end and one side bent upwardly to provide prows for said full width and full length runner surface, said prows having holes for attaching a hitch and providing a means to tow said boat either lengthwise or sideways along the earth, said hinge plates attached to said main plate with hinges and clevises, the top of said prows and said hinge plates forming a brim to hold materials in said boat.

3. A farm utility boat, comprising, a main steel plate, a long steel hinge plate, a short steel hinge plate, hinges and clevises for attaching all plates together to form a rectangular farm utility boat that slides on the earth and hauls materials, said main plate having a flat bottom surface to provide a full width and full length runner surface for said boat, said main plate having one end and one side bent upwardly to form prows for said full width and full length runner surface, holes formed in said prows for attaching a hitching means to tow said boat either lengthwise or sideways along the earth, said hinge plates and said prows providing a means to hold materials in said boat.

4. The combination, with a farm utility boat, a long steel hinge plate and a short steel hinge plate attached with hinges and clevises to a main steel plate, a full width and full length runner surface being provided by the flat bottom surface of said main steel plate, prows for said runner surface being formed by one end and one side of said main steel plate bent upwardly, holes in said prows for attaching a hitch to tow said boat either lengthwise or sideways on the earth, a brim to hold materials in said boat being formed by said hinge plates and said prows.

5. A farm utility boat, consisting of, a main steel plate, a long steel hinge plate, a short steel hinge plate, hinges and clevises for attaching all plates together, said main plate having a flat bottom sliding surface to provide a full width and length runner surface for said boat, said main plate having one end and one side formed upwardly to provide prows for said runner surface, holes formed in said prows for attaching a hitch to tow said boat either lengthwise or sideways on the earth, said hinge plates and said prows providing a means to hold materials in said boat.

HAROLD SWANSON.

REFERENCES CITED

The following references are of record in the file of this patent:

UNITED STATES PATENTS

| Number | Name | Date |
|--------|------|------|
| 531,937 | Herman | Jan. 1, 1895 |
| 1,064,237 | McClure | June 10, 1913 |
| 1,544,965 | Bavousett | July 7, 1925 |
| 2,332,259 | Reuther | Oct. 19, 1943 |
| 2,424,964 | Jones | July 29, 1947 |
| 2,451,866 | Ormond | Oct. 19, 1948 |